United States Patent
Qian et al.

(10) Patent No.: US 7,751,158 B2
(45) Date of Patent: Jul. 6, 2010

(54) VOLTAGE REGULATOR MODULE CONTROL CIRCUIT

(75) Inventors: Cheng Qian, Shenzhen (CN); Jin-Liang Xiong, Shenzhen (CN); Ning Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 196 days.

(21) Appl. No.: 11/960,753

(22) Filed: Dec. 20, 2007

(65) Prior Publication Data

US 2009/0141411 A1     Jun. 4, 2009

(30) Foreign Application Priority Data

Nov. 29, 2007   (CN) .................... 2007 1 0202778

(51) Int. Cl.
    *H02H 3/22* (2006.01)
(52) U.S. Cl. ........................ 361/18; 361/111
(58) Field of Classification Search ............... 361/18, 361/111
    See application file for complete search history.

(56) References Cited

U.S. PATENT DOCUMENTS

| 5,659,208 A * | 8/1997 | Kimble et al. ............... 307/82 |
| 5,952,733 A * | 9/1999 | Johnston .................... 307/44 |
| 6,473,280 B1 * | 10/2002 | Buxton et al. ............... 361/18 |
| 7,126,315 B2 * | 10/2006 | Seo .......................... 323/272 |
| 7,176,661 B2 * | 2/2007 | Kranz ........................ 323/222 |

* cited by examiner

*Primary Examiner*—Danny Nguyen
(74) *Attorney, Agent, or Firm*—Frank R. Niranjan

(57) ABSTRACT

An exemplary voltage regulator module (VRM) control circuit includes a VRM providing a plurality of phases, each of the phases connected to a control terminal of a corresponding electric switch; a comparator comprising a non-inverting terminal connected to a first power source and grounded via the electric switches respectively, an inverting terminal connected to a reference voltage, and an output terminal; and a control switch connected between an enable terminal of the VRM and ground, the control switch comprising a control terminal connected to the output terminal of the comparator, wherein, if one of the phases of the VRM is lost, the corresponding electric switch is turned off, and a voltage of the non-inverting terminal of the comparator is higher than the reference voltage, the comparator outputs a control signal to the control switch for turning on the control switch, thus turning off the VRM.

4 Claims, 1 Drawing Sheet

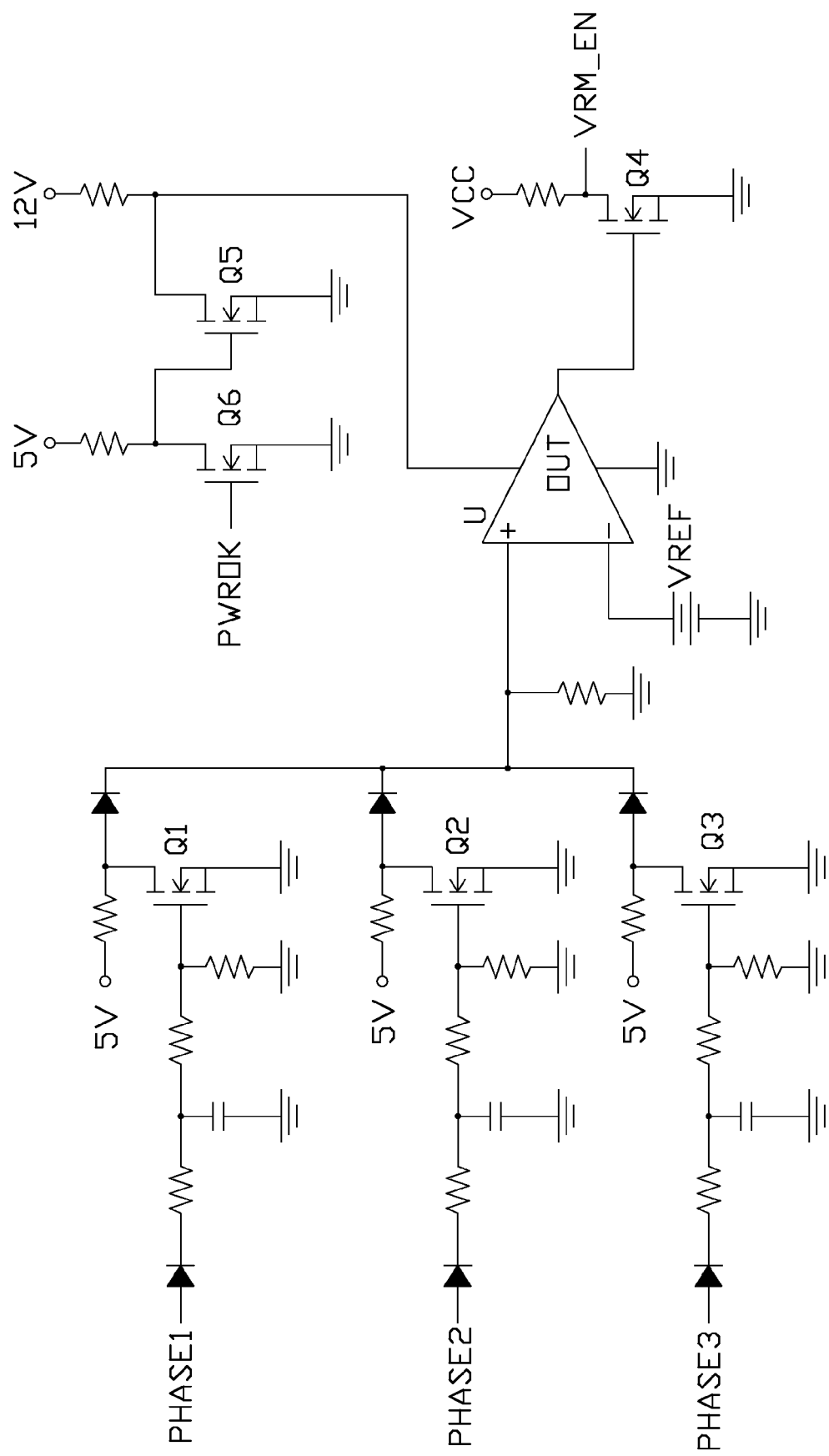

VOLTAGE REGULATOR MODULE CONTROL CIRCUIT

BACKGROUND

1. Field of the Invention

The present invention relates to control circuits, and particularly to a voltage regulator module control circuit.

2. Description of Related Art

In order to deliver a highly accurate supply voltage to microprocessors, a dedicated DC/DC converter is usually placed in close physical and electrical proximity to the processor or other chip or module having such requirements. Such a converter is often provided in a modular form and is referred to as a voltage regulator module (VRM). Most common of the currently used VRM circuit topologies are multiphase (e.g. two or more phases) buck converters, the principal benefits of which are ripple voltage cancellation effect, efficiency, relatively small module size, and the ability to use relatively inexpensive components. More specifically, the ripple cancellation effect between the phases allows use of small inductances to improve transient response and minimization of output filter capacitance.

Use of more than two phases can interleave the conductor currents between the individual phase channels and thereby greatly reduce the total ripple currents flowing into the output capacitors. Such further reduction of ripple current by use of three or more phases allows use of even smaller inductors to improve transient response and allows for a small capacitance to meet transient requirements. Reduced ripple voltage also allows for more voltage deviation during transients because the ripple voltage will consume less of the voltage tolerance budget.

However, a three phase VRM can work normally when one phase thereof is not available. Therefore, the remaining two phases of the VRM which are provided to the microprocessor draw more current. It is dangerous for the VRM to drive the microprocessor with only two phases, because the heavy current may damage the VRM or reduce stability of the VRM.

What is needed, therefore, is a VRM control circuit which can solve the above problem.

SUMMARY

An exemplary voltage regulator module (VRM) control circuit comprises a VRM providing a plurality of phases, each of the phases connected to a control terminal of a corresponding electric switch; a comparator comprising a non-inverting terminal connected to a first power source and grounded via the electric switches, an inverting terminal connected to a reference voltage, and an output terminal; and a control switch connected between an enable terminal of the VRM and ground, the control switch comprising a control terminal connected to the output terminal of the comparator, wherein, if one of the phases of the VRM is lost, the corresponding electric switch is turned off, and a voltage of the non-inverting terminal of the comparator is higher than the reference voltage, the comparator outputs a control signal to the control switch for turning on the control switch, thus turning off the VRM.

Other advantages and novel features of the present invention will become more apparent from the following detailed description of preferred embodiment when taken in conjunction with the accompanying drawing, in which:

BRIEF DESCRIPTION OF THE DRAWINGS

The drawing is a circuit diagram of a VRM control circuit in accordance with a embodiment of the present invention.

DETAILED DESCRIPTION

Referring to the drawing, a voltage regulator module (VRM) control circuit in accordance with an embodiment of the present invention includes six NMOS transistors Q1~Q6 functioning as electric switches and a comparator U. The gates of the NMOS transistors Q1~Q3 are connected to three phases PHASE1~PHASE3 of a VRM respectively. The sources of the NMOS transistors Q1~Q3 are grounded. Each one of the drains of the NMOS transistors Q1~Q3 is connected to a 5V power source and a non-inverting terminal + of the comparator U. An inverting terminal − of the comparator U is connected to a reference voltage VREF. The output terminal OUT of the comparator U is connected to the gate of the NMOS transistor Q4. The source of the NMOS transistor Q4 is grounded, and the drain of the NMOS transistor Q4 is connected to a power source VCC and an enable terminal VRM_EN of the VRM.

The comparator U further comprises a power terminal connected to a 12V power source and the drain of the NMOS transistor Q5. The source of the NMOS transistor Q5 is grounded, and the gate of the NMOS transistor Q5 is connected to the 5V power source and the drain of the NMOS transistor Q6. The source of the NMOS transistor Q6 is grounded, and the gate of the NMOS transistor Q6 is connected to a power supply to receive a power-good signal PWROK.

When the computer is turned off, the power-good signal PWEROK is at a low level to turn off the NMOS transistor Q6. Therefore, the NMOS transistor Q5 is turned on for turning off the comparator U.

When the computer is turned on, the power-good signal is at a high level to turn on the NMOS transistor Q6. Therefore, the NMOS transistor Q5 is turned off for turning on the comparator U. If the phases PHASE1~PHASE3 of the VRM are working normally, the NMOS transistors Q1~Q3 are turned on. Therefore, the output terminal OUT of the comparator U is at a low level to turn off the NMOS transistor Q4. That is, the enable terminal VRM_EN of the VRM is connected to the power source VCC for turning on the VRM.

If one of the phases PHASE1~PHASE3 of the VRM is lost, the corresponding NMOS transistor is turned off. For example, if the phase PHASE1 is lost, the NMOS transistor Q1 will be turned off. Therefore, the output terminal OUT of the comparator U is at a high level to turn on the NMOS transistor Q4 for grounding the enable terminal VRM_EN of the VRM to turn off the VRM.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A voltage regulator module (VRM) control circuit comprising:
   a VRM providing a plurality of phases, each of the phases connected to a control terminal of a corresponding electric switch;
   a comparator comprising a non-inverting terminal connected to a first power source and grounded via the electric switches respectively, an inverting terminal connected to a reference voltage, a power terminal connected to a second power source under the control of a switch module, and an output terminal; and
   a control switch connected between an enable terminal of the VRM and ground, the control switch comprising a control terminal connected to the output terminal of the comparator;
   wherein, if one of the phases of the VRM is lost, the corresponding electric switch is turned off, and a voltage of the non-inverting terminal of the comparator is higher than the reference voltage, the comparator outputs a control signal to the control switch for turning on the control switch.

2. The VRM control circuit as claimed in claim 1, wherein the electric switches are NMOS transistors each with a grounded source, a drain connected to the non-inverting terminal of the comparator, and a gate connected to the corresponding phase of the VRM.

3. The VRM control circuit as claimed in claim 1, wherein the control switch is an NMOS transistor with a grounded source, a drain connected to the enable terminal of the VRM, and a gate connected to the output terminal of the VRM.

4. The VRM control circuit as claimed in claim 1, wherein the switch module comprises a first and a second NMOS transistors, the drain of the first NMOS transistor is connected to the second power source and the power terminal of the comparator, the gate of the first NMOS transistor is connected to the first power source and the drain of the second NMOS transistor, the gate of the second NMOS transistor is connected to a power supply for receiving a power-good signal to turn on the second NMOS transistor, the sources of the first and second NMOS transistors are grounded.

* * * * *